(12) United States Patent
Kumar

(10) Patent No.: US 12,282,897 B1
(45) Date of Patent: Apr. 22, 2025

(54) SYSTEM AND METHOD FOR ESTABLISHING CONTEXTUAL LINKS BETWEEN DATA IN A CONSTRUCTION ENVIRONMENT

(71) Applicant: Slate Technologies Inc., Pleasanton, CA (US)

(72) Inventor: Senthil Manickavasagam Kumar, Dublin, CA (US)

(73) Assignee: Slate Technologies Inc., Pleasanton, CA (US)

( * ) Notice: Subject to any disclaimer, the term of this patent is extended or adjusted under 35 U.S.C. 154(b) by 0 days.

(21) Appl. No.: 18/419,807

(22) Filed: Jan. 23, 2024

(51) Int. Cl.
| G06N 5/02 | (2023.01) |
| G06F 40/30 | (2020.01) |
| G06Q 10/0631 | (2023.01) |
| G06Q 10/10 | (2023.01) |
| G06Q 50/08 | (2012.01) |

(52) U.S. Cl.
CPC .......... *G06Q 10/103* (2013.01); *G06F 40/30* (2020.01); *G06N 5/02* (2013.01); *G06Q 10/06312* (2013.01); *G06Q 50/08* (2013.01)

(58) Field of Classification Search
None
See application file for complete search history.

(56) References Cited

U.S. PATENT DOCUMENTS

| 2,052,346 | A | 8/1936 | Garrett |
| 7,113,915 | B1 | 9/2006 | Montemayor |
| 7,283,975 | B2 | 10/2007 | Broughton |

(Continued)

FOREIGN PATENT DOCUMENTS

| CN | 114723402 A | 7/2022 |
| KR | 102496584 B1 | 2/2023 |

(Continued)

OTHER PUBLICATIONS

Malakar, et al., Proceedings of the 30th International Workshop on Bayesian Inference and Maximum Entropy Methods in Science and Engineering. AIP Conference Proceedings, vol. 1305. AIP Conference Proceedings, vol. 1305, Issue 1, 2010, pp. 157-164 (Year: 2010).*

(Continued)

*Primary Examiner* — Wilbert L Starks
(74) *Attorney, Agent, or Firm* — Haverstock & Owens, A Law Corporation

(57) ABSTRACT

A method for establishing and generating contextual links between data from a plurality of data sources is described. The method includes receiving data and decomposing the received data into a decomposed data set; parsing and analyzing the decomposed data set based on a set of attribute analyzers to associate one or more attributes to the decomposed data set; determining an intent of data from the decomposed data set; generating a semantic graph of the decomposed data set based on the intent of data to evaluate data relatability between the decomposed data set; generating atomic knowledge units (AMUs) based on the parsed decomposed data set and the semantic graph; analyzing the AMUs corresponding to the received data by applying trained machine learning models to generate links between the AMUs and processing the generated links by a model ensemble to establish contextual links between data.

18 Claims, 7 Drawing Sheets

(56) References Cited

U.S. PATENT DOCUMENTS

| | | |
|---|---|---|
| 8,204,619 B2 | 6/2012 | Heil |
| 8,260,648 B2 | 9/2012 | Elazouni et al. |
| 8,775,229 B1 | 7/2014 | Danskin |
| 9,070,216 B2 | 6/2015 | Golparvar-Fard et al. |
| 9,189,571 B2 | 11/2015 | Loberg |
| 9,507,885 B2 | 11/2016 | Yu et al. |
| 9,996,810 B2 | 6/2018 | Augenstein et al. |
| 10,311,529 B1 | 6/2019 | Noel et al. |
| 10,452,790 B2 | 10/2019 | Kim et al. |
| 10,460,173 B2 | 10/2019 | Sasson et al. |
| 10,572,848 B2 | 2/2020 | Sen |
| 10,713,607 B2 | 7/2020 | Pettersson et al. |
| 10,846,640 B2 | 11/2020 | Goel et al. |
| 10,970,796 B2 | 4/2021 | Sasson et al. |
| 11,017,335 B1 | 5/2021 | Ponce de Leon |
| 11,100,663 B2 | 8/2021 | Nemoto et al. |
| 11,176,495 B1 | 11/2021 | Ron et al. |
| 11,208,807 B1 | 12/2021 | Lopes |
| 11,263,371 B2 | 3/2022 | Bowen et al. |
| 11,263,557 B2 | 3/2022 | Yellin |
| 11,381,726 B2 | 7/2022 | Zass |
| 11,416,958 B1 | 8/2022 | Reichert et al. |
| 11,481,853 B2 | 10/2022 | Bellaish et al. |
| 11,531,943 B1 | 12/2022 | Kumar |
| 2002/0156668 A1 | 10/2002 | Morrow et al. |
| 2003/0018507 A1 | 1/2003 | Flanagan |
| 2003/0200062 A1 | 10/2003 | Dessureault et al. |
| 2004/0236547 A1 | 11/2004 | Rappaport et al. |
| 2006/0059838 A1 | 3/2006 | Pimental |
| 2006/0075718 A1 | 4/2006 | Borne et al. |
| 2006/0190391 A1 | 8/2006 | Cullen, III et al. |
| 2006/0228962 A1 | 10/2006 | Souther et al. |
| 2007/0245300 A1 | 10/2007 | Chan et al. |
| 2007/0265724 A1 | 11/2007 | Mifsud et al. |
| 2007/0271073 A1 | 11/2007 | Mifsud et al. |
| 2008/0005079 A1 | 1/2008 | Flake et al. |
| 2008/0015823 A1 | 1/2008 | Arnold et al. |
| 2008/0040264 A1 | 2/2008 | Allin et al. |
| 2008/0077364 A1 | 3/2008 | Wakelam et al. |
| 2008/0109330 A1 | 5/2008 | Torres |
| 2008/0313110 A1 | 12/2008 | Kreamer |
| 2010/0010883 A1 | 1/2010 | Neilsen et al. |
| 2010/0153280 A1 | 6/2010 | Fox et al. |
| 2010/0235206 A1 | 9/2010 | Miller et al. |
| 2010/0325196 A1 | 12/2010 | Beckman et al. |
| 2010/0325578 A1 | 12/2010 | Mital et al. |
| 2011/0181589 A1 | 7/2011 | Quan et al. |
| 2012/0066019 A1 | 3/2012 | Hinshaw et al. |
| 2012/0131878 A1 | 5/2012 | Ivanov |
| 2012/0166177 A1 | 6/2012 | Beld et al. |
| 2013/0155058 A1 | 6/2013 | Golparvar-fard et al. |
| 2014/0122143 A1 | 5/2014 | Fletcher |
| 2015/0193561 A1 | 7/2015 | Lindberg et al. |
| 2015/0310135 A1 | 10/2015 | Forsyth et al. |
| 2016/0292306 A1 | 10/2016 | Migneault et al. |
| 2016/0350973 A1 | 12/2016 | Shapira et al. |
| 2016/0378861 A1 | 12/2016 | Eledath et al. |
| 2017/0337261 A1 | 11/2017 | Wang |
| 2018/0276319 A1 | 9/2018 | Tierney et al. |
| 2018/0330258 A1 | 11/2018 | Harris |
| 2019/0012605 A1 | 1/2019 | Rajagopal et al. |
| 2019/0138667 A1 | 5/2019 | Benesh et al. |
| 2019/0200169 A1 | 6/2019 | Bapna et al. |
| 2019/0286985 A1 | 9/2019 | Hirvijarri |
| 2019/0294673 A1 | 9/2019 | Sapugay et al. |
| 2019/0303512 A1 | 10/2019 | Davies et al. |
| 2019/0317805 A1 | 10/2019 | Metsch et al. |
| 2020/0042915 A1 | 2/2020 | Samson |
| 2020/0057811 A1 | 2/2020 | Seegan et al. |
| 2020/0412926 A1 | 12/2020 | Zass et al. |
| 2020/0413011 A1 | 12/2020 | Zass et al. |
| 2021/0073694 A1 | 3/2021 | Yellin et al. |
| 2021/0081819 A1 | 3/2021 | Polleri et al. |
| 2021/0081859 A1 | 3/2021 | Goel |
| 2021/0104100 A1 | 4/2021 | Whitney et al. |
| 2021/0120206 A1 | 4/2021 | Liu et al. |
| 2021/0125124 A1 | 4/2021 | Meharwade et al. |
| 2021/0192099 A1 | 6/2021 | Benromano et al. |
| 2021/0287177 A1 | 9/2021 | Musialek et al. |
| 2021/0316457 A1 | 10/2021 | Kang et al. |
| 2021/0316459 A1 | 10/2021 | Kang et al. |
| 2021/0350310 A1 | 11/2021 | Tashkin |
| 2021/0383033 A1 | 12/2021 | Glenn et al. |
| 2022/0066456 A1 | 3/2022 | Ebrahimi Afrouzi et al. |
| 2022/0084140 A1 | 3/2022 | Daczko et al. |
| 2022/0130145 A1 | 4/2022 | Connary et al. |
| 2022/0215135 A1 | 7/2022 | Shortridge |
| 2022/0245353 A1 | 8/2022 | Turkkan et al. |
| 2022/0284366 A1 | 9/2022 | Kelly et al. |
| 2022/0318936 A1 | 10/2022 | Copley et al. |
| 2022/0343155 A1 | 10/2022 | Mitra |
| 2022/0358259 A1 | 11/2022 | Manish et al. |
| 2022/0405436 A1 | 12/2022 | Jung et al. |
| 2023/0185978 A1 | 6/2023 | Danon et al. |
| 2023/0251631 A1 | 8/2023 | Pederson et al. |
| 2024/0144373 A1 | 5/2024 | Wu |

FOREIGN PATENT DOCUMENTS

| | | |
|---|---|---|
| WO | 2019216825 A1 | 11/2019 |
| WO | 2020113305 A1 | 6/2020 |
| WO | 2022026520 A1 | 2/2022 |

OTHER PUBLICATIONS

Cedeno-Mieles, et al., Networked Experiments and Modeling for Producing Collective Identity in a Group of Human Subjects Using an Iterative Abduction Framework, Social Network Analysis and Mining, 10:11, Jan. 7, 2020, pp. 1-43 (Year: 2020).*

Castano, et al., Thematic Clustering and Exploration of Linked Data, Lecture Notes in Computer Science (LNCS) 7538, pp. 157-175, 2012 (Year: 2012).*

Zhou, et al., Contextual Ensemble Network for Semantic Segmentation, Pattern Recognition, vol. 122, Feb. 2022, 108290, pp. 1-11 (Year: 2022).*

Calikus, et al., Wisdom of the Contexts: Active Ensemble Learning for Contextual Anomaly Detection, arXiv:2101.11560v4 [cs.LG] pp. 1-46, Oct. 4, 2022 (Year: 2022).*

Gao, et al., ComFact: A Benchmark for Linking Contextual Commonsense Knowledge, Findings of the Association for Computational Linguistics: EMNLP 2022, pp. 1656-1675, Dec. 11, 2022 (Year: 2022).*

Jun Yang et al., Construction Performance Monitoring Via Still Images, Time-Lapse Photos and Video Streams; Now, Tomorrow, and The Future , Advance Engineering Informatics, vol. 29, Issue 2, 2015, pp. 211-224, ISSN 1474-0346. (Year 2015).

Venkatasubramanian, Karthik, "Using AI and Machine Learning to Predict Construction Schedule Delays", Oracle Construction and Engineering Blog, Jul. 1, 2021, pp. 1-5.

Fitzsimmons, John et al., "Improving Construction Project Schedules Before Execution", 37th International Symposium on Automation and Robotics in Construction (ISARC 2020), pp. 1-8.

Yang et al., ("Adopting Building Information Modeling (BIM) for the Development of Smart Buildings: A Review of Enabling Applications and Challenges", Hindawi Advances in Civil Engineering, 2010, pp. 1-26) (Year 2010).

Valdes et al. ("Applying Systems Modeling Approaches to Building Construction", ISARC 2016, pp. 1-9 (Year 2016).

Bortolini et al. ("Site logistics planning and control for engineer-to-order prefabricated building systems using BIM 4D modelling", Automation in Construction 98 (2019) 248-264) (Year 2019).

International Searching Authority, "International Search Report and Written Opinion" in application No. PCT/US2023/012778, dated May 16, 2023, 18 pages.

International Searching Authority, "International Search Report and Written Opinion" in application No. PCT/US2023/014257, dated Jun. 2, 2023, 14 pages.

(56) References Cited

OTHER PUBLICATIONS

ChatGPT in Real Estate: Enhancing Property Search and Customer Queries, Open AI, Sep. 29, 2023, 10 pages, https://dasha.ai/en-us/blog/chatgpt-in-real-estate-enhancing-property-search-and-customer-queries.

6 Types of Agents in AI (Artificial Intelligence) for your Business, Tanisha Verma, Aug. 16, 2023, 24 pages, https://www.rezo.ai/our-blogs/types-of-agents-in-ai.

CrewAI Unleashed: Future of AI Agent Teams, Joao Moura, Dec. 21, 2023, 10 pages, https://blog.langchain.dev/crewai-unleashed-future-of-ai-agent-teams/.

International Searching Authority, "International Search Report" and Written Opinion in application No. PCT/US2022/047823, dated Dec. 7, 2022, 10 pages.

Taiwan Patent Office, "Office Action", in application No. 111143737, dated Apr. 17, 2023, 8 pages.

International Searching Authority, "International Search Report" and "Written Opinion" in application No. PCT/US2023/015098, dated Apr. 17, 2023, 7 pages.

International Searching Authority, "International Search Report" and "Written Opinion" in application No. PCT/US2023/016515, dated Jun. 22, 2023, 8 pages.

International Searching Authority, "International Search Report" and "Written Opinion" in application No. PCT/US2023/016521, dated Jul. 12, 2023, 18 pages.

Notification Concerning Transmittal of International Preliminary Report on Patentability for PCT Patent Application No. PCT/US2023/012778 dated Sep. 19, 2024.

Notification Concerning Transmittal of International Preliminary Report on Patentability for PCT Patent Application No. PCT/US2023/014257 dated Sep. 19, 2024.

Notification Concerning Transmittal of International Preliminary Report on Patentability for PCT Patent Application No. PCT/US2023/016515 dated Oct. 10, 2024.

Notification Concerning Transmittal of International Preliminary Report on Patentability for PCT Patent Application No. PCT/US2023/016521 dated Oct. 10, 2024.

Mishra et al., Context Driven Proactive Decision Support for Hybrid Teams, Fall 2019, Association for the Advancement of Artificial Intelligence, pp. 41-57 (Year:2019).

Li et al.: Collaborative Filtering Algorithm with Social Information and Dynamic Windows, 2022, Applied Intelligence, Springer, pp. 5261-5272 (Year: 2022).

Notification Concerning Transmittal of International Preliminary Report on Patentability for PCT Patent Application No. PCT/US2023/015098 dated Oct. 10, 2024.

International Preliminary Report on Patentability, International Application No. PCT/US2022/047823, mailed May 30, 2024.

The Notification of Transmittal of the International Search Report and the Written Opinion of the International Searching Authority of the Declaration from International Application No. PCT/US24/30726, dated Aug. 7, 2024, 13 pages.

* cited by examiner

SYSTEM AND METHOD FOR ESTABLISHING CONTEXTUAL LINKS BETWEEN DATA IN A CONSTRUCTION ENVIRONMENT

FIELD OF THE INVENTION

The present disclosure relates generally to artificial intelligence (AI) and machine learning (ML) driven contextual linking of disparate data streams to meet set objectives. Specifically, the present disclosure relates to establishing contextual linking between data from multiple systems in a construction environment based on various forms of knowledge, computational techniques, and set system objectives. The set system objectives may include schedule optimization, cost optimization, sustainability mandates, preventing waste, analyzing efficient resources and more.

The present disclosure is related to U.S. patent application Ser. No. 17/984,468, filed Nov. 10, 2022, and titled "Intelligence Driven Method and System for Multi-Factor optimization of Schedules and Resource Recommendations for Smart Construction," U.S. patent application Ser. No. 18/107,653, filed Feb. 9, 2023, and titled "System and Method for Manufacture and Customization of Construction Assemblies in a Computing Environment," U.S. patent application Ser. No. 18/116,017, filed Mar. 1, 2023, and titled "System and Method for Creation of a Project Manifest in a Computing Environment," and U.S. patent application Ser. No. 17/894,418, filed Aug. 24, 2022, and titled "System and Method for Computational Simulation and Augmented/Virtual Reality in a Construction Environment," the entire contents of which are hereby incorporated by reference for all purposes as if fully set forth herein.

BACKGROUND OF THE INVENTION

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

BACKGROUND OF THE INVENTION

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

Conventionally, construction data, such as construction schedule, daily logs, Issues, Inspection, change orders, checklists, etc., present in disparate systems are not unified in the way the data is stored, organized, and related. This makes it challenging to derive, from such data, contextual insights on the construction project and related metrics. The construction data from disparate systems need to be linked to provide a situational and contextual Intelligence such as analysis of causality of issues, its impact to a given schedule metric, cost implications and environmental impact.

One approach to solve the problem stated above could be to establish common data-warehouses and implement custom insight generation systems spanning multiple instances of data and try to get a relationship established; however, conventionally, construction businesses use multiple disparate and, often, siloed software systems and each business seldom uses any common industry standards practices. Thus, the integration of these systems is extremely complex, unreliable in their data correlation and expensive. Further, these solutions are not inherently scalable and are expensive to maintain as new data streams and new types of data are generated.

Accordingly, there is a need for technical solutions that address the needs described above, as well as other inefficiencies of the state of the art. Accordingly, there is a need in the art to intelligently establish contextual linking between data from disparate systems in a construction environment for generation of meaningful insights associated with a construction project.

SUMMARY OF THE DISCLOSURE

In some embodiments, systems that establish contextual linking between data from a plurality of data sources, are described. The executable and operational systems (and their associated subsystems) provide linking between construction data from disparate systems using artificial intelligence (AI) and machine learning (ML) driven computational techniques.

The following represents a summary of some embodiments of the present disclosure to provide a basic understanding of various aspects of the disclosed herein. This summary is not an extensive overview of the present disclosure. It is not intended to identify key or critical elements of the present disclosure or to delineate the scope of the present disclosure. Its sole purpose is to present some embodiments of the present disclosure in a simplified form as a prelude to the more detailed description that is presented below.

Embodiments of an AI-based system and a corresponding method are disclosed that address at least some of the above challenges and issues. In an embodiment, the subject matter of the present disclosure discloses a method establishing contextual links between data from a plurality of data sources in a computing environment. The method comprises receiving data from the plurality of data sources, wherein the plurality of data sources corresponds to disparate systems generating unlinked, seemingly unrelated datasets; decomposing the received data into a decomposed granular data set; parsing and analyzing the decomposed granular data set based on a set of attribute and objective analyzers to associate one or more attributes to the decomposed granular data set; determining an intent of data from the decomposed data set associated with each of the plurality of data sources; generating a semantic graph of the decomposed data set based on the intent of data to evaluate relatability and relevance between the decomposed data set; generating atomic knowledge units corresponding to the received data based on the parsed decomposed data set and the semantic graph, wherein the atomic knowledge units represent received data in an organized data format; analyzing the atomic knowledge units corresponding to the received data by applying one or more trained machine learning models to generate links between the atomic knowledge units based on the one or more attributes; and processing the generated links by a model ensemble implementing an ensemble learning to establish contextual links between data from the plurality of data sources.

In an embodiment of the present disclosure, the method may further include analyzing the contextual links between data from the plurality of data sources to generate a linked data set; analyzing the linked data set based on one or more construction objectives; and generating one or more insights related to a construction project based on the analysis of the linked data set in view of the one or more construction objectives and a give construction situation to help with situational intelligence.

In an embodiment of the present disclosure, the method may further include training a machine learning model using training data including data relating to the construction project and one or more user inputs received from a user; and applying the trained machine learning model to analyzing the atomic knowledge units corresponding to the received data to generate links between the atomic knowledge units.

In an embodiment of the present disclosure, applying the one or more trained machine learning models may further include applying attribute-based machine learning models on the atomic knowledge units; and applying non-attribute-based machine learning models trained on construction data on the atomic knowledge units to generate links between the atomic knowledge units.

In an embodiment of the present disclosure, decomposing the received data into the decomposed data set may further include breaking down the received data into smaller units of relevant data and irrelevant data; and removing the irrelevant data from the decomposed data set.

In an embodiment of the present disclosure, parsing and analyzing the decomposed data set based on the set of attribute analyzers may further include analyzing the decomposed data set based on one or more of a semantic analyzer, a temporal analyzer, a resource analyzer, an intent analyzer, and a location parser.

In an embodiment of the present disclosure, the method may further include storing the atomic knowledge units in a multi-dimensional data format including one or more of a multi-dimensional cube representation, a vector representation, word embeddings, a semantic representation, and a linked graph structure data representation.

In an embodiment of the present disclosure, the method may further include analyzing the atomic knowledge units to generate links between the atomic knowledge units further comprising processing, by a Natural Language Processing (NLP) module, the atomic knowledge units to perform a semantic feature analysis of the atomic knowledge units.

In an embodiment of the present disclosure, the method may further include analyzing, by a NLP classifier, the processed atomic knowledge units to perform text classification by assigning a set of tags to one or more portions of the atomic knowledge units; and generating links between atomic knowledge units based on a relatability of the set of tags.

In an embodiment of the present disclosure, processing the generated links by the model ensemble may further include determining a score associated with each generated link; and correlating the generated links based on the score and one or more construction objectives to establish the contextual links between data from the plurality of data sources.

In an embodiment, the subject matter of the present disclosure may relate to a system for establishing contextual links between data from a plurality of data sources in a computing environment. The system may include an Autolink Module having a controller configured to receive data from the plurality of data sources, wherein the plurality of data sources corresponds to disparate systems generating unlinked data; decompose the received data into a decomposed data set; parse and analyze the decomposed data set based on a set of attribute analyzers to associate one or more attributes to the decomposed data set; determine an intent of data from the decomposed data set associated with each of the plurality of data sources; generate a semantic graph of the decomposed data set based on the intent of data to evaluate data relatability between the decomposed data set; generate atomic knowledge units corresponding to the received data based on the parsed decomposed data set and the semantic graph, wherein the atomic knowledge units represent received data in an organized data format; analyze the atomic knowledge units corresponding to the received data by applying one or more trained machine learning models to generate links between the atomic knowledge units based on the one or more attributes; and process the generated links by a model ensemble implementing an ensemble learning to establish contextual links between data from the plurality of data sources.

In an embodiment of the present disclosure, the system may further include an Insights Module configured to analyze the situational and contextual correlation between data from the plurality of data sources to generate a linked data set; analyze the linked data set based on one or more construction objectives; and generate one or more insights related to a construction project based on the analysis of the linked data set in view of the one or more construction objectives.

In an embodiment of the present disclosure, the system may further include a Training Module configured to train a machine learning model using training data including data relating to the construction project and one or more user inputs received from a user; and provide the trained machine learning model to the Autolink Module to analyze the atomic knowledge units corresponding to the received data to generate links between the atomic knowledge units.

In an embodiment of the present disclosure, the controller is further configured to apply attribute-based machine learning models on the atomic knowledge units; and apply non-attribute-based machine learning models trained on construction data on the atomic knowledge units to generate links between the atomic knowledge units.

In an embodiment of the present disclosure, the controller is further configured to break down the received data into smaller units of relevant data and irrelevant data; and remove the irrelevant data from the received data to generate the decomposed data set.

In an embodiment of the present disclosure, the system may further include an Atomic Knowledge Units Generator configured to parse and analyze the decomposed data set, the Atomic Knowledge Units Generator comprises a semantic analyzer, a temporal analyzer, a resource analyzer, an intent analyzer, and a location parser.

In an embodiment of the present disclosure, the system may further include a Multi-dimensional Data Module configured to store the atomic knowledge units in a multi-dimensional data format including one or more of a multi-dimensional cube representation, a vector representation, word embeddings, a semantic representation, and a linked graph structure data representation.

In an embodiment of the present disclosure, the system may further include a Natural Language Processing (NLP) Module configured to perform a semantic correlation and a semantic feature analysis of the atomic knowledge units.

In an embodiment of the present disclosure, the system may further include an NLP Classifier configured to perform text classification on processed atomic knowledge units by assigning a set of tags to one or more portions of the atomic knowledge units, wherein the links between atomic knowledge units are generated based on a relatability of the set of tags.

In an embodiment, the subject matter of the present disclosure may relate to non-transitory computer-readable storage medium, having stored thereon a computer-executable program which, when executed by at least one processor, causes the at least one processor to receive data from the plurality of data sources, wherein the plurality of data sources corresponds to disparate systems generating unlinked data; decompose the received data into a decomposed data set; parse and analyze the decomposed data set based on a set of attribute analyzers to associate one or more attributes to the decomposed data set; determine an intent of data from the decomposed data set associated with each of the plurality of data sources; generate a semantic graph of the decomposed data set based on the intent of data to evaluate data relatability between the decomposed data set; generate atomic knowledge units corresponding to the received data based on the parsed decomposed data set and the semantic graph, wherein the atomic knowledge units represent received data in an organized data format; analyze the atomic knowledge units corresponding to the received data by applying one or more trained machine learning models to generate links between the atomic knowledge units based on the one or more attributes; and process the generated links by a model ensemble implementing an ensemble learning to establish contextual links between data from the plurality of data sources.

The above summary is provided merely for the purpose of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

Further advantages of the invention will become apparent by reference to the detailed description of disclosed embodiments when considered in conjunction with the drawings.

DETAILED DESCRIPTION

Figure 1:
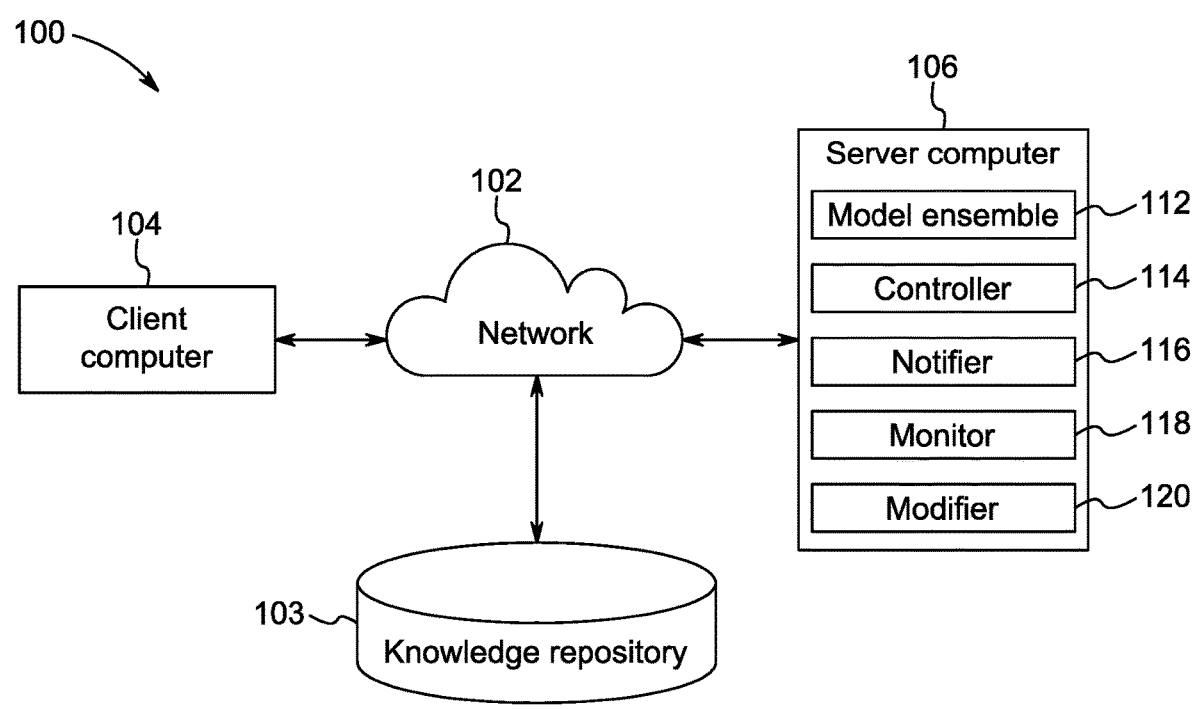
FIG. 1 illustrates an exemplary network architecture, according to some embodiments.

The following detailed description is presented to enable a person skilled in the art to make and use the disclosure. For purposes of explanation, specific details are set forth to provide a thorough understanding of the present disclosure. However, it will be apparent to one skilled in the art that these specific details are not required to practice the disclosure. Descriptions of specific applications are provided only as representative examples. Various modifications to the preferred embodiments will be readily apparent to one skilled in the art, and the general principles defined herein may be applied to other embodiments and applications without departing from the scope of the disclosure. The present disclosure is not intended to be limited to the embodiments shown but is to be accorded the widest possible scope consistent with the principles and features disclosed herein.

Certain terms and phrases have been used throughout the disclosure and will have the following meanings in the context of the ongoing disclosure.

A "network" may refer to a series of nodes or network elements that are interconnected via communication paths. In an example, the network may include any number of software and/or hardware elements coupled to each other to establish the communication paths and route data/traffic via the established communication paths. In accordance with the embodiments of the present disclosure, the network may include, but is not limited to, the Internet, a local area network (LAN), a wide area network (WAN), an Internet of things (IoT) network, and/or a wireless network. Further, in accordance with the embodiments of the present disclosure, the network may comprise, but is not limited to, copper transmission cables, optical transmission fibers, wireless transmission, routers, firewalls, switches, gateway computers, and/or edge servers.

The term "device" in some embodiments, may be referred to as equipment or machine without departing from the scope of the ongoing description.

A "controller" or a "processor" may include a module that performs the methods described in accordance with the embodiments of the present disclosure. The module of the processor may be programmed into the integrated circuits of the processor, or loaded in memory, storage device, or network, or combinations thereof.

"Machine learning" may refer to as a study of computer algorithms that may improve automatically through experience and by the use of data. Machine learning algorithms build a model based at least on sample data, known as "training data," in order to make predictions or decisions without being explicitly programmed to do so. Machine learning algorithms are used in a wide variety of applications, such as in medicine, email filtering, speech recognition, and computer vision, where it is difficult or unfeasible to develop conventional algorithms to perform the needed tasks.

In machine learning, a common task is the study and construction of algorithms that can learn from and make correlations between data. Such algorithms function by making data-driven correlations or decisions, through building a mathematical model from input data. These input data used to build the model are usually divided in multiple data sets. In particular, three data sets are commonly used in various stages of the creation of the model: training, validation, and test sets. The model is initially fit on a "training data set," which is a set of examples used to fit the parameters of the model. The model is trained on the training data set using a supervised learning method. The model is run with the training data set and produces a result, which is then compared with a target, for each input vector in the training data set. Based at least on the result of the comparison and the specific learning algorithm being used, the parameters of the model are adjusted. The model fitting can include both variable selection and parameter estimation.

Successively, the fitted model is used to predict the responses for the observations in a second data set called the "validation data set." The validation data set provides an unbiased evaluation of a model fit on the training data set while tuning the model's hyperparameters. Finally, the "test data set" is a data set used to provide an unbiased evaluation of a final model fit on the training data set.

"Deep learning" may refer to a family of machine learning models composed of multiple layers of neural networks, having high expressive power and providing state-of-the-art accuracy.

"Repository" or "Database" may refer to an organized or an unorganized collection of information, or data, typically stored electronically in a computer system.

"Data feed" is a mechanism for devices and, in some embodiments, by extension users to receive updated data from data sources. It is commonly used by real-time applications in point-to-point settings as well as on the World Wide Web.

"Ensemble learning" is the process by which multiple models, such as classifiers or experts, are strategically generated and combined to solve a particular computational intelligence problem. Ensemble learning is primarily used to improve the (classification, prediction, function approximation, etc.) performance of a model, or reduce the likelihood of an unfortunate selection of a poor one. In an example, an ML model selected for correlating construction data streams is different from an ML model required for processing a statistical input for sensitivity.

In accordance with the embodiments of the disclosure, a method and system for establishing contextual links between data from a plurality of data sources in a computing environment is disclosed. The system includes an Autolink Module (which may be part of a controller of the system) that is configured to receive data from the plurality of data sources, wherein the plurality of data sources corresponds to disparate systems generating unlinked data. The controller is further configured to decompose the received data into a decomposed data set, parse and analyze the decomposed data set based on a set of attribute analyzers to associate one or more attributes to the decomposed data set. Further, the controller determines an intent of data from the decomposed data set associated with each of the plurality of data sources, generates a semantic graph of the decomposed data set based on the intent of data to evaluate data relatability between the decomposed data set, and generates atomic knowledge units corresponding to the received data based on the parsed decomposed data set and the semantic graph, wherein the atomic knowledge units represent received data in an organized data format for further processing. The atomic knowledge units corresponding to the received data are analyzed by applying one or more trained machine learning models to generate links between the atomic knowledge units based on the one or more attributes. The controller then processes the generated links by a model ensemble implementing an ensemble learning to establish contextual links between data from the plurality of data sources.

The embodiments of the methods and systems are described in more detail with reference to FIGS. 1-6.

FIG. 1 illustrates an example system 100 for establishing contextual links between data from a plurality of data sources in a computing environment, according to some embodiments. FIG. 1 illustrates an example networked computer system 100 with which various embodiments of the present disclosure may be implemented. FIG. 1 is shown in simplified, schematic format for purposes of illustrating a clear example and other embodiments may include more, fewer, or different elements. FIG. 1 and the other drawing figures, and all of the description and claims in this disclosure are intended to present, disclose and claim a technical system and technical methods. The technical system and methods as disclosed includes specially programmed computers, using a special-purpose distributed computer system design and instructions that are programmed to execute the functions that are described. These elements execute to provide a practical application of computing technology to the problem of linking data streams from disparate systems to generate meaningful insights associated with a construction project. In this manner, the current disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In some embodiments, the networked computer system 100 may include a client computer 104, a server computer 106, and a knowledge repository 108, which are communicatively coupled directly or indirectly via network(s) 102. In an embodiment, the server computer 106 broadly represents one or more computers, such as one or more desktop computers, server computers, a server farm, a cloud computing platform, a parallel computer, virtual computing instances in public or private datacenters, and/or instances of a server-based application. The server computer 106 may be accessible over the network 102 by the client computer 104 to query the system or request an insight. The client computer 104 may include a desktop computer, laptop computer, tablet computer, smartphone, or any other type of computing device that allows access to the server computer 106. The elements in FIG. 1 are intended to represent one workable embodiment but are not intended to constrain or limit the number of elements that could be used in other embodiments.

The server computer 106 may include one or more computer programs or sequences of program instructions in organization. Such organization implements artificial intelligence/machine learning algorithms to generate data pertaining to various requirements, such as design consideration factors in a construction project, controlling functions, notifying functions, monitoring functions, and modifying functions. A set of diverse or even mutually exclusive programs or sequences of instructions are organized together to implement diverse functions to generate data associated with design consideration factors. Such a set may be referred to herein as a model ensemble 112 to implement an ensemble learning. Programs or sequences of instructions organized to implement the controlling functions, such as establishing contextual links between data, may be referred to herein as autolink controller 114 (referred to as "controller 114" herein). Programs or sequences of instructions organized to implement the notifying functions may be referred to herein as a notifier 116. Programs or sequences of instructions organized to implement the monitoring functions may be referred to herein as an efficiency analysis and process monitor 118 (referred to as "monitor 118" herein). Programs or sequences of instructions organized to implement the modifying functions may be referred to herein as a modifier 120. The controller 114, the notifier 116, the monitor 118 and the modifier 120 may be integrated together as a system on chip or as separate processors/controllers/registers. Accordingly, the respective functions of the controller 114, the notifier 116, the monitor 118, and the modifier 120 essentially correspond to processing or controller functions.

The model ensemble 112, the controller 114, the notifier 116, the monitor 118, and/or the modifier 120 may be part of an artificial intelligence (AI) system implemented by the server computer 106. In an embodiment, the networked computer system 100 may be an AI system and may include the client computer 104, the server computer 106, and the knowledge repository 108 that are communicatively coupled to each other. In an embodiment, one or more components of the server computer 106 may include a processor configured to execute instructions stored in a non-transitory computer readable medium.

In an embodiment, the model ensemble 112 may include a plurality of modules, and each of the plurality of modules may include an ensemble of one or more machine learning models (e.g., Naive Bayes, K-Nearest Neighbor, Linear and Logistic Regression, Support Vector Machines, Random Forest, Decision Tree, and the like) to process data feed from a plurality of data sources. The data feed in turn corresponds to current data received in real-time from dynamic data sources from disparate systems, some of which may correspond to a remote database(s) or a local database(s), such as those of the knowledge repository 108.

In an embodiment, the controller 114 may be programmed to intelligently establish contextual linking between data from disparate systems in a construction environment for generation of meaningful insights associated with a construction project. The controller 114 is further discussed in detail below.

In an embodiment, the notifier 116 may be programmed to provide notifications to the user. The notifier 116 may receive such notifications from the controller 114 and the knowledge repository 108. The notifications may include, but not limited to, audio, visual, or textual notifications in the form of indications or prompts. The notifications may be indicated in a user interface (e.g., a graphical user interface) to the user. In one example, the notifications may include, but not limited to, queries associated to a construction project, feedback on generated linkages, and insights associated with the project. In other example, a notification may include graphical representation of computational predictions associated with contextual linking of data and/or associated insights. In other example, a notification allows an avatar or personified animation of the user to navigate the virtual environment for visual introspection through a virtual reality headgear worn over the head and/or a stylus pen held in hand as known in the state of the art. Based on a head or limb movement of the user wearing the virtual reality headgear, the avatar may walk-through or drive-through various virtual locations of the metaverse. In other example, a notification facilitates such avatar to make real-time changes/updates/annotations that affect the contextual linking and/or generated insights.

In an embodiment, the monitor 118 is programmed to receive feedback that may be used to execute corrections and alterations at the controller 114 side to fine tune decision making. For example, the monitor 118 may be programmed to receive user validation and/or feedback of proposed links between disparate data streams and/or corresponding insights.

In some embodiments, the modifier 120 may be programmed to receive modification data to update existing artificial intelligence models in the system 100 and to add new artificial intelligence models to the system 100. Modification data may be provided as input by the user via an input interface (e.g., a graphical user interface). In other example, the modification may be determined automatically through external sources and/or databases.

In some embodiments, in keeping with sound software engineering principles of modularity and separation of function, components of the server computer 106, such as the model ensemble 112, the controller 114, the notifier 116, the monitor 118, and the modifier 120, are each implemented as a logically separate program, process, or library. They may also be implemented as hardware modules or a combination of both hardware and software modules without limitation.

Computer executable instructions described herein may be in machine executable code in the instruction set of a CPU and may be compiled based upon source code written in Python, JAVA, C, C++, OBJECTIVE-C, or any other human-readable programming language or environment, alone or in combination with scripts in JAVASCRIPT, other scripting languages and other programming source text. In another embodiment, the programmed instructions may also represent one or more files or projects of source code that are digitally stored in a mass storage device such as non-volatile RAM or disk storage, in the systems of FIG. 1 or a separate repository system, which when compiled or interpreted cause generation of executable instructions that in turn upon execution cause the computer to perform the functions or operations that are described herein with reference to those instructions. In other words, the figure may represent the manner in which programmers or software developers organize and arrange source code for later compilation into an executable, or interpretation into bytecode or the equivalent, for execution by the server computer 106.

The server computer 106 may be communicatively coupled to the knowledge repository 108. In some embodiments, the knowledge repository 108 may store a plurality of data feeds collected from various disparate systems, such as, a construction site or an AEC site, third-party paid or commercial databases, and real-time feeds, such as RSS, or the like. As described herein, the real-time data, near real-time data, and collated data are received by the monitor 118 and are processed by the various components of the server computer 106 depending on the construction objectives. In some embodiments, the knowledge repository 108 may also store any data generated by the system 100 during generation of contextual links of disparate data streams. For example, the knowledge repository 108 may include a vector database for storing atomic knowledge units (AKUs).

The network 102 broadly represents a combination of one or more local area networks (LANs), wide area networks (WANs), metropolitan area networks (MANs), global interconnected internetworks, such as the public internet, or a combination thereof. Each such network may use or execute stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein may be configured to connect to the network 102 and the disclosure presumes that all elements of FIG. 1 are communicatively coupled via the network 102. The various elements depicted in FIG. 1 may also communicate with each other via direct communication links that are not depicted in FIG. 1 to simplify the explanation.

The ML models disclosed herein may include appropriate classifiers and ML methodologies. Some of the ML algorithms include (1) Multilayer Perceptron, Support Vector Machines, Bayesian learning, K-Nearest Neighbor, or Naive Bayes as part of supervised learning, (2) Generative Adversarial Networks as part of Semi Supervised learning, (3) Unsupervised learning utilizing Autoencoders, Gaussian Mixture and K-means clustering, and (4) Reinforcement learning (e.g., using a 0-learning algorithm, using temporal difference learning), and other suitable learning styles. Knowledge transfer is applied, and, for small footprint devices, Binarization and Quantization of models is performed for resource optimization for ML models. Each module of the plurality of ML models can implement one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Eclat algorithm, etc.), an artificial neural network model (e.g., a Perceptron method, a back-propagation method, a self-organizing map method, a learning vector quantization method, etc.), a deep learning algorithm (e.g., a restricted Boltzmann machine, a deep belief network method, a convolution network method, a stacked autoencoder method, etc.), and a dimensionality reduction method (e.g., principal component analysis, partial least squares regression, multidimensional scaling, etc.). Each processing portion of the system 100 can additionally leverage: a probabilistic, heuristic, deterministic or other suitable methodologies for computational guidance, recommendations, machine learning or combination thereof. However, any suitable machine learning approach can otherwise be incorporated in the system 100. Further, any suitable model (e.g., machine learning, non-machine learning, etc.) can be used in the system 100 of the present disclosure.

Figure 2:
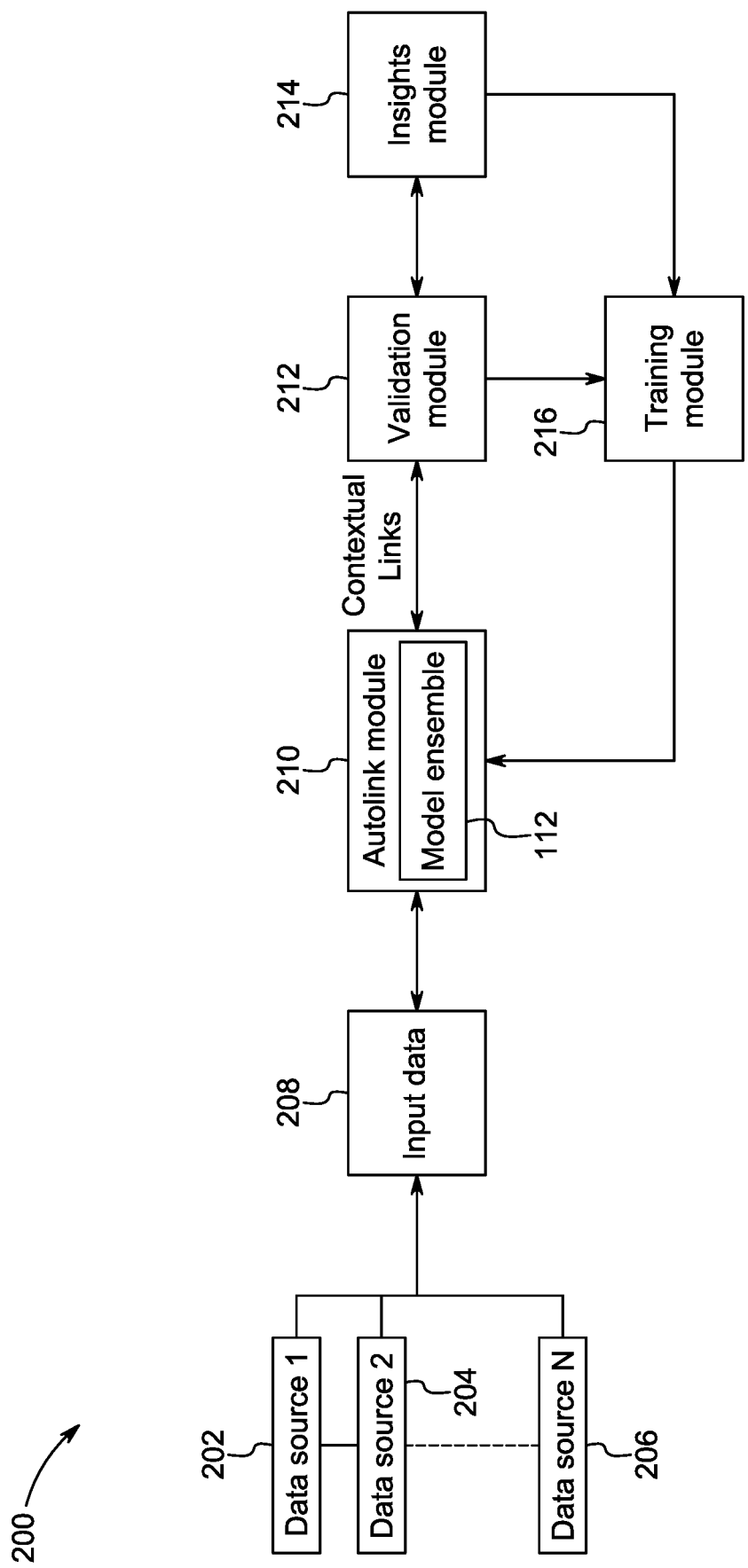
FIG. 2 illustrates an example computational system in accordance with the disclosed embodiments.

FIG. 2 illustrates an example computational system 200 in accordance with the disclosed embodiments. The computational system 200 includes a plurality of data sources and/or dynamic data sources, depicted as data source 1 202, data source 2 204, data source N 206, and so on. The data sources may include one or more systems in a construction environment, such as, but not limited to, construction or AEC site systems, third-party paid or commercial databases, real-time feeds, supplier databases, schedule trackers, daily logs, change order tracking systems, and the like. These data sources may employ different systems and/or formats for tracking, storing, and outputting data, and therefore, the data from these dynamic data sources may be organized in a fashion that it may appear unrelated and/or unlinked to each other. Data from the data sources 202, 204, 206 is provided to the system 200 as input data 208.

Further, as shown in FIG. 2, the system 200 includes an Autolink module 210, a Validation module 212, an Insights module 214, and a Training module 216. In an embodiment, the Autolink module 210, the Validation module 212, the Insights module 214, and/or the Training module 216 may be implemented as a part of or within the controller 114 of FIG. 1.

The Autolink module 210 receives the input data 208 from the plurality of data sources 202, 204, 206. The Autolink module 210 uses Artificial Intelligence (AI) techniques to contextualize construction data and establish connections between data from disparate systems. Input data 208 from the plurality of data sources 202, 204, 206 is parsed and processed using machine learning techniques to generate contextual links between the data, such that, the linked data may further be analyzed and/or queried to generate meaningful insights related to the construction project. For example, a schedule for a construction project may define the individual tasks and/or workflow for executing the project. The schedule may be dependent, directly or indirectly, on various data streams and/or documents, such as a daily log of resources or activities, checklists maintained by the construction workers or inspection officers, change order requests, budget details, supplier data, and the like (e.g., from data sources 202, 204, 206). If a user wants an insight into expected schedule delays, the system is able to intelligently read, associate, and link relevant details from all these different documents and identify how they affect the schedule. The Autolink module 210 enable this by decomposing data into smaller units of relevant datasets, identifying an associated attribute for decomposed datasets, and processing it further using AI and ML techniques to generate contextual links between data from the plurality of data sources.

Further, as shown in FIG. 2, the Autolink module 210 may use the Model Ensemble 112 of FIG. 1. The Model Ensemble 112 may include multiple models, such as classifiers or experts, strategically generated and combined to solve a particular computational intelligence problem. Ensemble learning is primarily used to improve the (classification, correlation, function approximation, etc.) performance of a model, or reduce the likelihood of an unfortunate selection of a poor one. In an example, an ML model selected for correlating disparate construction data streams is different from an ML model required for processing a statistical input for sensitivity. The Model Ensemble may include machine learning techniques, deep learning techniques, neural networks, deep learning with hidden layers, or a combination of these techniques. The Model Ensemble 112 will be discussed in detail with reference to FIG. 5. The Autolink module 210 will be discussed in detail with reference to FIGS. 3-5.

The Validation module 212 receives contextually linked data from the Autolink module 210, as shown in FIG. 2. The Validation module 212 provides, or otherwise causes to be displayed, the generated contextual linked data to a user, such as a construction project manager or a supervisor, to validate the derived correlation between the input data. This may enable the user to review and if needed, modify the links prior to further processing. For example, the Autolink module 210 may link supply delay information associated with a concrete supplier to a scheduled task "pour concrete" and present the linked information to the user for validation. The user may select whether or not the delay would impact the scheduled task based on the details available with the user. In an embodiment, the system 200 may receive the user input (user feedback), for example, via an interface such as a graphic user interface or a sensor such as an acoustic sensor, imaging sensor etc. The user input may be in the form of a single media input and/or a multimedia input. For example, the user may provide an image as an input and may also enter textual content related to the image to aid in modifying the established link. Thus, data from both input streams, that is, the image and the text are considered as the user input by the Validation module 212. The Validation module 212 further processes and parses user input to either validate the generated contextual links for further processing or provides modification data to the Autolink module 210 directly or indirectly such as through the Training module 216, as shown in FIG. 2.

The Training module 216 may be configured to train the one or more ML models used by the Autolink module 210 for establishing contextual links between data streams. The one or more models may be trained on a training data set generated or otherwise provided by the Training module 216 using a supervised and/or unsupervised learning method. The one or more models may be run with the training data set to adjust the parameter(s) of the models. In an embodiment, the Training module 216 may be continuously updated with additional training data obtained within or outside the system 100, 200. Training data may include historic user/customer data and synthetically algorithm-generated data tailored to test efficiencies of the different machine learning and/or artificial intelligence models described herein. Synthetic data may be authored to test a number of system efficiency coefficients. This may include false positive and negative recommendation rates, model resiliency, and model recommendation accuracy metrics. An example of training data set may include data relating to task completion by a contractor earlier than a projected time schedule. Another example of training data set may include data relating to modifications made by a user on an established link. Another example of a training data set may include several queries on construction projects received over a period of time from multiple users as user inputs. Yet another example of a training data set may include a mapping between queries and associated user intent for each query. Thus, the Training module 216 may iteratively train and/or improve the one or more machine learning and/or artificial intelligence models employed by the Autolink module 210.

The Insights module 214 may receive contextual links from the Autolink module 210, through the Validation module 212 for example, to generate meaningful insights associated with a construction project. In an embodiment, the Insights module 214 may be configured to analyze the contextual links between data from the plurality of data sources to generate a linked data set, analyze the linked data set based on one or more construction objectives, and generate one or more insights related to the construction project based on the analysis of the linked data set in view of the one or more construction objectives. The term "construction objectives", may refer to a collection of different user requirements, project requirements, regulatory requirements, technical requirements, or the like. Construction objectives may be established prior to the start of construction activities and can be adjusted during construction phases to factor in varying conditions. Construction objectives may be defined at each construction project and construction phase level. Data definition of construction objectives defines normalized construction objectives. Examples of such normalized objectives include parameters for optimization of construction schedule to meet time objectives, optimization for cost objectives, optimization for Carbon footprint objectives, which are normalized to factor in worker health, minimize onsite workers, and minimize quality issues. One or more construction objectives may be identified as part of a schedule request for a construction activity of a construction project. Further, the objective may be determined from an input from a user identifying the objective and/or the intent based on a natural language parser. In one example, a construction objective may be to keep the cost below a budgeted amount.

The Insights module 214 may analyze the linked data set based on one or more construction objectives to generate insights associated with the project. For example, the construction objective may be to complete the construction project within six months, and the linked data set may indicate potential delays associated with regulatory requirements. Hence, in this example, the Insights module 214 may generate a recommendation and/or an alert for a user to initiate the procedure for obtaining the regulatory permit to avoid potential delay in view of the targeted completed timeline. In an embodiment, the Insights module 214 may also provide feedback and/or training data to the Training module 216, as shown in FIG. 2.

Figure 3A:
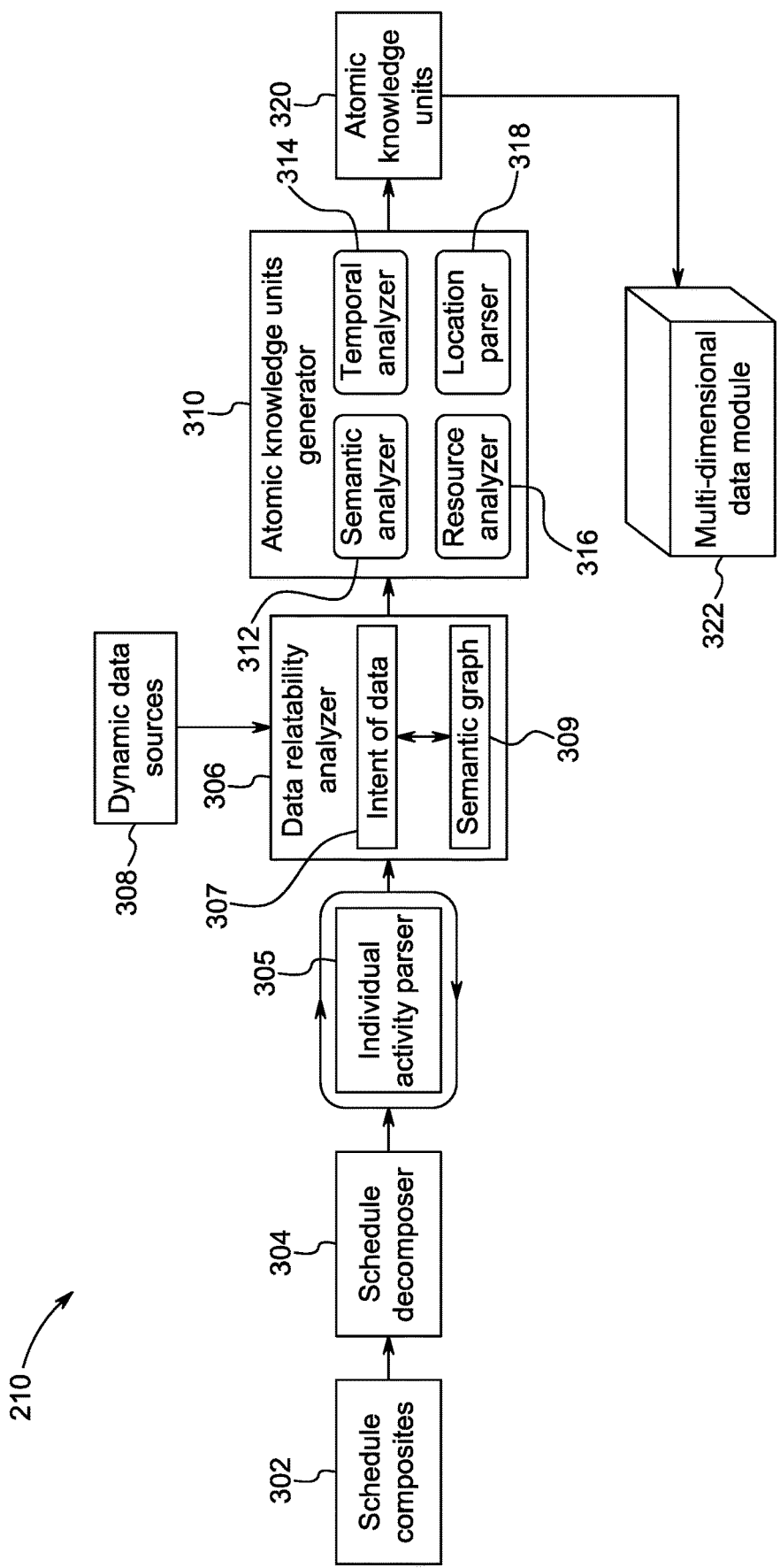
FIG. 3A illustrates an example Autolink Module in accordance with the disclosed embodiments.

FIG. 3A illustrates an example Autolink module 210 in accordance with one or more embodiments of the present disclosure. The Autolink module 210, as shown in FIG. 3A, includes a Schedule Composites 302, a Schedule Decomposer 304, an Individual Activity Parser 305, a Data Reliability Analyzer 306, an Atomic Knowledge Units Generator 310, and a Multi-dimensional Data Module 322. The Schedule Composites 302 may communicatively couple with one or more data sources corresponding to schedule data/information associated with a construction project. The schedule data/information may be formed of multiple pieces or portions of data, some of which may seem unrelated but may have an impact on the overall schedule of the construction project. The Schedule Composites 302 identifies and combines all such data for further processing.

The Autolink module 210 further includes the Schedule Decomposer 304 that receives combined schedule data/information from the Schedule Composites 302, as shown in FIG. 3A. The Schedule Decomposer 304 is configured to decompose or otherwise process the received schedule data into a granular decomposed data set. Specifically, the Schedule Decomposer 304 breaks down the received schedule data into smaller units of relevant data and irrelevant data based on the schedule information and/or construction objectives. For example, the combined schedule data provided by the Schedule Composites 302 may include a daily log that lists details of a task for which the data are to be linked. The daily log may also include data related to other tasks, that may be irrelevant to the system for the given objective and/or context. Thus, such data may be classified as irrelevant data by the Schedule Decomposer 304. Additionally, each task may also be broken down into smaller units, of phrases or individual words, some of which may be relevant while others may be redundant or irrelevant, such as, articles, prepositions, pronouns, conjunctions, punctuations, etc. The Schedule Decomposer 304 may remove the irrelevant data from the decomposed data set for further processing. It should be noted that the Schedule decomposer 304 may be implemented using one or more techniques known in the art, such as, but not limited to, Natural Language Processing (NLP) based decomposers, semantic parsers, and the like.

Further, as shown in FIG. 3A, the granular decomposed data set from the Schedule Decomposer 304 is provided to the Individual Activity Parser 305. The Individual Activity Parser 305 extracts individual tasks or activities associated with a schedule from the decomposed data. The Individual Activity Parser 305 works iteratively with the Schedule decomposer 304 to extract each individual activity from the schedule data.

The Autolink module 210 further includes the Data Relatability Analyzer 306 that receives data from Dynamic Data Sources 308, as shown in FIG. 3A. The Dynamic Data Sources 308 may correspond to the plurality of data sources 202, 204, 206, as discussed above with reference to FIG. 2. Dynamic Data Sources 308 may provide additional data related to the construction project, other than the schedule information provided by the Schedule Composites 302. For example, the data provided by the Dynamic Data Sources 308 may include a daily log of resources or activities, checklists maintained by the construction workers or inspection officers, change order requests, budget details, supplier data, and the like. The Data Relatability Analyzer 306 evaluates relatability between data received from a plurality of sources in view of a construction task and/or activity data received from the Individual Activity Parser 305. The Data Relatability Analyzer 306 includes an Intent of data module 307 and a Semantic graph module 309.

The Intent of data module 307 determines an intent associated with data received from the Individual Activity Parser 305 and/or the Dynamic Data Sources 308. That is, the Intent of data module 307 determines the intent and/or objective associated with an individual task and/or data received from a data source. For example, if a user raises a Request for Information (RFI) about a foundation for a construction project, the Intent of data module 307 determines an intent behind the RFI. RFI in the construction industry is a formal document or process used by various parties involved in a construction project to seek clarification, details, or additional information about certain aspects of the construction project. RFIs are typically generated when there is uncertainty, ambiguity, or a need for more details regarding the project plans, specifications, or other project-related documents. Thus, the Intent of data module 307, firstly, identifies the reason behind raising the RFI. That is, the Intent of data module 307 may refer to the project schedule to check if the tasks associated with the foundation are running on time or are delayed, or it may determine from a supplier related alert that there is a supply chain blockage for raw material for the foundation, and the like. Thus, the Intent of data module 307 intelligently determines the intent behind the data (RFI).

Further, the Semantic graph module 309 generates a semantic knowledge graph of the data received from the Individual Activity Parser 305 and/or the Dynamic Data Sources 308 based on the determined intent of data. Semantic knowledge graphs are structured representations of data that capture relationships between entities. They organize information in a way that machines can understand, making it easier to connect and retrieve data. A semantic graph is described in detail with reference to FIG. 3B. The semantic graph generated by the Semantic graph module 309 using intent of data received from the Intent of data module 307 is further provided to the Atomic Knowledge Units Generator 310, as shown in FIG. 3A.

Thus, the extracted individual schedule tasks and/or activities and the semantic graph are provided to the Atomic Knowledge Units Generator 310, as shown in FIG. 3A. The Atomic Knowledge Units Generator 310 is configured to parse and analyze the extracted individual schedule tasks and/or activities from the decomposed data set based on a set of attribute analyzers to associate one or more attributes to the decomposed data set. As shown in FIG. 3A, the Atomic Knowledge Units Generator 310 may include a Semantic Analyzer 312, a Temporal Analyzer 314, a Resource Analyzer 316, and a Location Parser 318. It should be noted that the attribute analyzers listed herein and depicted in FIG. 3A are for exemplary purposes and the present disclosure is not limited to these analyzers. For example, in an embodiment, the Atomic Knowledge Units Generator 310 may also include an intent analyzer that may be configured to parse and analyze the extracted data based on the associated intent. The attribute analyzers of the Atomic Knowledge Units Generator 310 are configured to parse and analyze the decomposed data set and associate one or more attributes, such as, a temporal notion, a location tag, etc., to an individual schedule task/activity or a portion of the decomposed data set. For example, an individual activity of a construction schedule may specify, "install window frames in cafeteria tomorrow." The individual activity may be parsed and analyzed to identify one or more attributes. The Temporal Analyzer 314 may tag a temporal attribute to the word "tomorrow", and the Location Parser 318 may associate a location of the cafeteria, for example, second floor of the building, to the individual activity.

In some embodiments, the Atomic Knowledge Units Generator 310 generates atomic knowledge units (AKUs) corresponding to the received data based on the parsed decomposed data set and the semantic graph, wherein the atomic knowledge units represent received data in an organized data format for further processing. In an embodiment, the parsed and analyzed decomposed data sets are further decoded to generate atomic units of data specifying information in an organized and/or standardized format for establishing linking between data and/or generating insights using the relationship between data determined through the semantic graph. These smaller units of organized data are referred to as atomic knowledge units (AKUs) 320, as shown in FIG. 3A.

Further, as shown in FIG. 3A, the AKUs 320 are provided to the Multi-dimensional Data Module 322 for a multi-dimensional representation of the generated data. In an embodiment, the AKUs are stored in a multi-dimensional data format including one or more of a multi-dimensional cube representation, a vector representation, word embeddings, a semantic representation, and a linked graph structure data representation, in the knowledge repository 108 of FIG. 1. Multi-dimensional Data Module 322 organizes one or more attributes and/or dimensions associated with the data and enables users to dig deeper into probable trends or patterns. With a multi-dimensional data representation, a user may interrogate queries rather than just submit them, as practiced in relational databases. For example, a data cube is defined by dimensions and facts and is represented by a fact table. Facts are numerical measures and fact tables contain measures of the related dimensional tables or names of the facts. This allows a system and/or a user to view the data from many dimensions and perspectives. Similarly, a vector database is a type of database that stores data as high-dimensional vectors, which are mathematical representations of features or attributes. Each vector has a certain number of dimensions, which can range from tens to thousands, depending on the complexity and granularity of the data. The vectors are usually generated by applying a transformation and/or embedding function to raw data. The transformation function can be based on various methods, such as machine learning models, word embeddings, feature extraction algorithms, and the like. The main advantage of a vector database is that it allows for fast and accurate similarity search and retrieval of data based on their vector distance or similarity. That is, a user may use a vector database to find the most similar or relevant data based on their semantic or contextual meaning. Thus, the AKUs are stored in a multi-dimensional data format by the Multi-dimensional Data Module 322 for further processing.

Figure 3B:
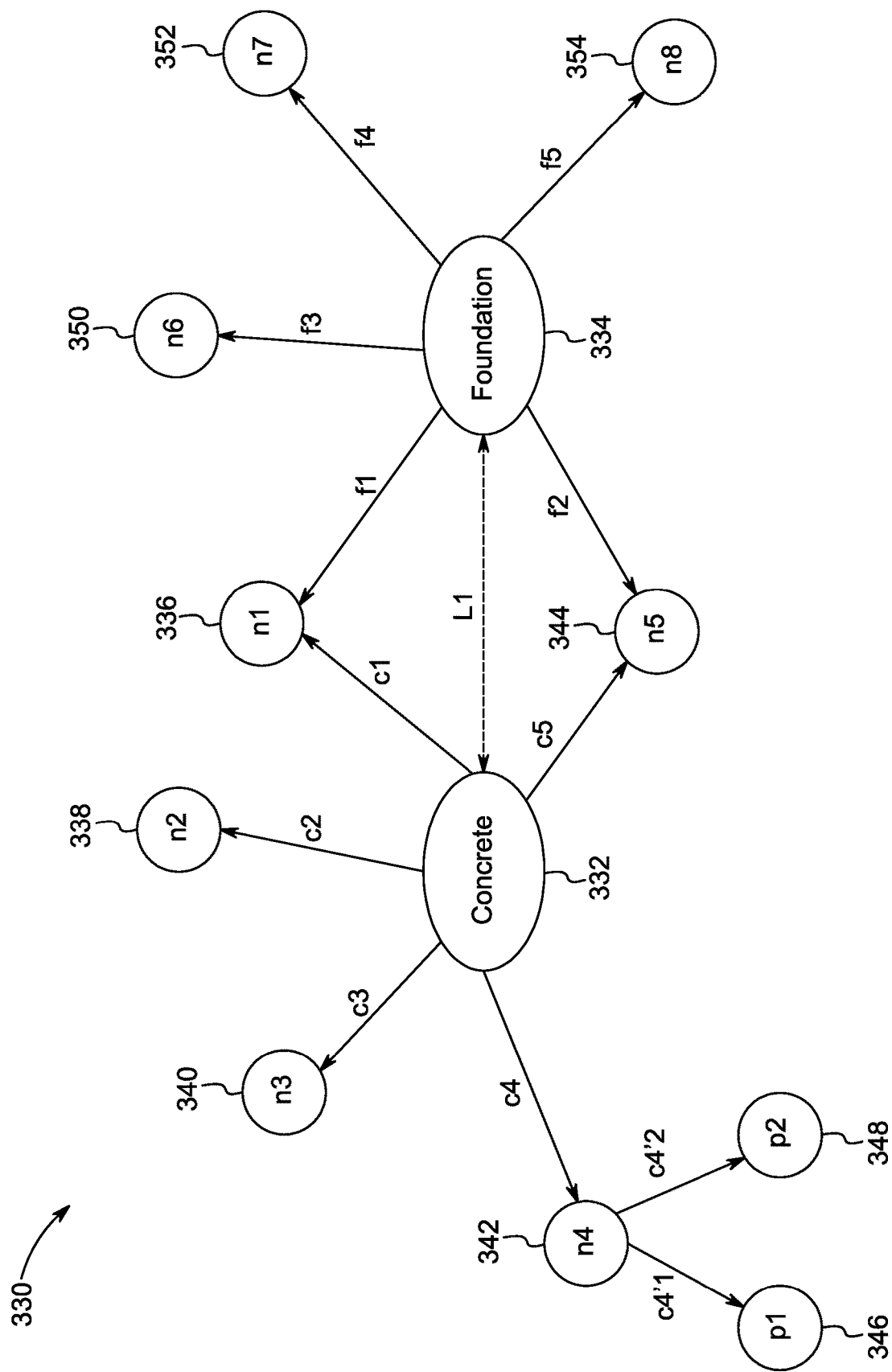
FIG. 3B illustrates an example semantic graph in accordance with the disclosed embodiments.

FIG. 3B illustrates an example semantic graph 330 in accordance with one or more embodiments of the present disclosure. FIG. 3B illustrates a semantic graph 330 depicting a linkage and/or relationship between the word "concrete" and the word "foundation" extracted from different data sources associated with a construction project. For example, a RFI may be received as "update on foundation". The Autolink module 210 may identify the intent behind the RFI by correlating it to the construction schedule and may identify a schedule task as "pour concrete" that may appear to be related based on the intent of both data sets. To further establish the relatability between these data sets, the Autolink module 210 may generate a semantic graph 330.

As shown, the semantic graph 330 includes an entity Concrete 332 and another entity Foundation 334, extracted from the schedule and/or the RFI. Each of these entities has nodes associated with them. For example, Concrete 332 has nodes n1 336, n2 338, n3 340, n4 342, and n5 344 connected through links c1, c2, c3, c4, and c5 to the entity. In the semantic graph, nodes represent attributes and/or properties associated with the entity, and links depict relationships between these nodes and the entity and/or between two nodes, forming a structured representation of data. Each of the nodes n1-n5 may depict an attribute associated with Concrete. For example, n1 336 may correspond to "Material" and link c1 may be "includes", n2 338 may correspond to "Industry" and link c2 may include "influences", n3 340 may correspond to "Structure" and link c3 may include "supports", n4 342 may correspond to "Property" and link c4 may include "characterized by", and n5 344 may correspond to "Construction Project" and link c5 may include "used in". Further, one or more of these nodes may include branch nodes, such as, node n4 342 includes branch nodes, p1 346 and p2 348 connected to node n4 through links c4'1 and c4'2, as shown in FIG. 3B. Branch nodes p1 346 and p2 348 may further define a property associated with the entity, such as, but not limited to, temperature of the concrete, shelf life, setting time, and the like.

Similarly, entity Foundation 334 may have nodes n1 336, n5 344, n6 350, n7 352, and n8 354 connected through links f1, f2, f3, f4, and f5 to the entity. Each of the nodes may depict an attribute associated with Foundation. For example, n1 336 may correspond to "Material" and link f1 may be "includes", n5 344 may correspond to "Construction Project" and link f2 may include "used in", n6 350 may correspond to "Soil type" and link f3 may include "rests on", n7 352 may correspond to "Foundation type" and link f4 may include "built as", and n8 354 may correspond to "Building type" and link f5 may include "supports".

The semantic graph as shown in FIG. 3B also depicts common attributes between the entities Concrete and Foundation, such as, but not limited to, node n1 336 "Material" and node n5 344 "Construction Project". These common nodes may be used to establish a relatability between these entities, such as linkage L1, as shown in the semantic graph. In an embodiment, linkage L1 may indicate relationship, such as, "used in" or "constructed with". Thus, through the intent of the data and the semantic graph, a phrase "pour concrete" may be distinguished from another phrase "concrete plans" even though they use the same term concrete. Further, a relationship may be established between two data sets, such as, a schedule task "pour concrete" and a RFI "update on the foundation", even though both use distinct terms.

Thus, the semantic graph, as shown in FIG. 3B, provides a semantic structure that captures relationships between entities Concrete and Foundation, allowing for a more nuanced understanding of the data. It should be noted that the semantic graph may also provide an indication of the degree of relatability between these entities. The degree of relatability between entities can be determined by the strength and nature of the relationships connecting them. For example, if there is a direct relationship and/or link between "Concrete" and "Foundation," such as "used in" or "constructed with," it may indicate a strong and direct connection. If both "Concrete" and "Foundation" share a common node (e.g., "construction project") with relevant relationship like "used in," this indirect connection contributes to their relatability. If there are related properties between "Concrete" and "Foundation", such as similar construction materials or structural characteristics, it adds to their relatability. Further, analyzing the overall connectivity of the semantic graph can provide insights into how closely entities are interconnected. A higher number of paths or links between "Concrete" and "Foundation" may indicate a stronger degree of relatability. In some embodiments, the links in the semantic graph may be weighted, indicating the strength or significance of each connection. Thus, these weights may be used to quantify the degree of relatability between entities. Furthermore, if the entities "Concrete" and "Foundation" frequently appear together or are consistently associated in the data, it suggests a higher degree of relatability. In summary, evaluating the direct and indirect links, shared properties, graph connectivity, and the frequency of interaction can help determine the degree of relatability between entities in the semantic graph.

Figure 4:
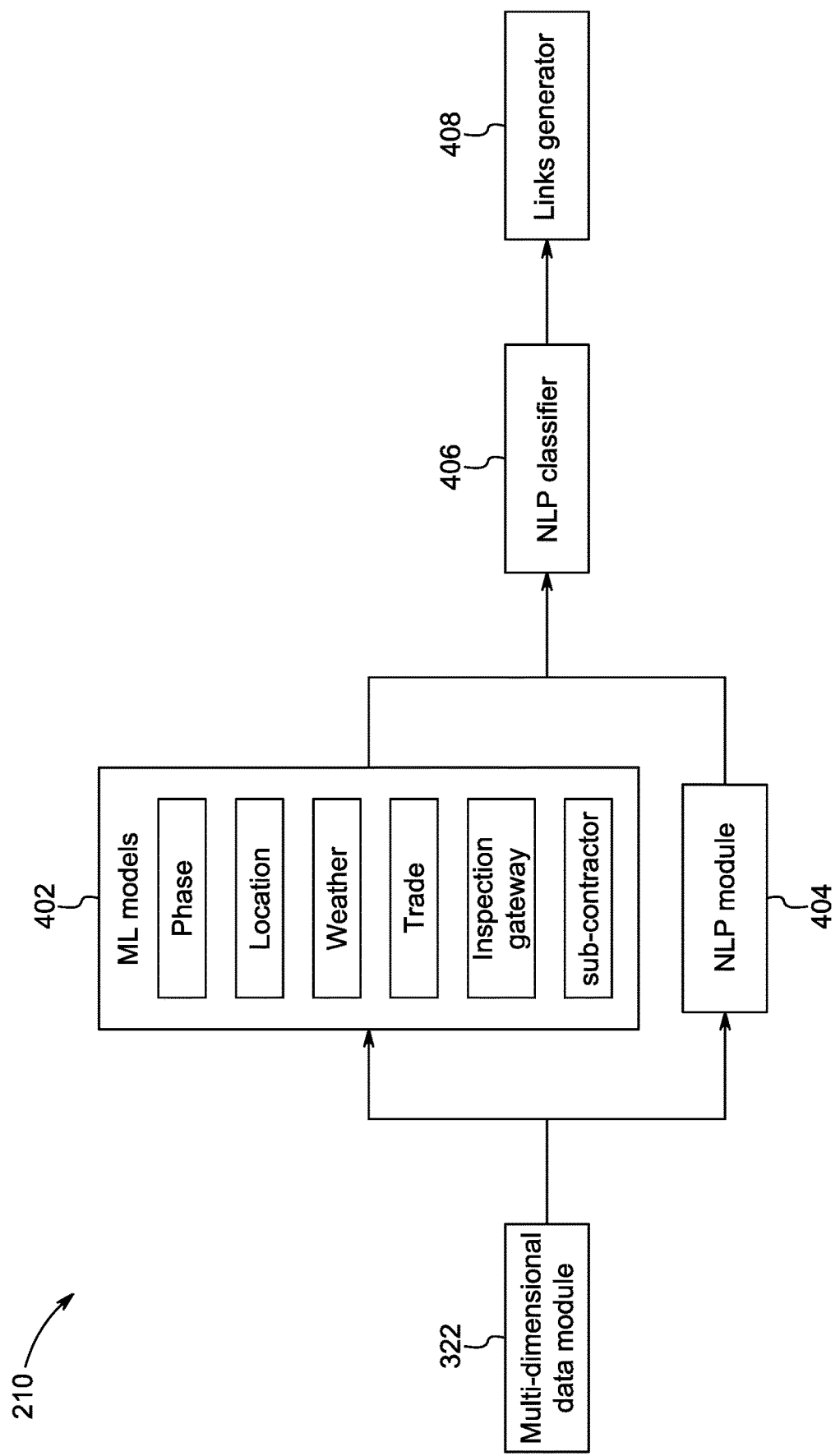
FIG. 4 illustrates additional sub-systems of the example Autolink Module illustrated in FIG. 3, in accordance with the disclosed embodiments.

FIG. 4 illustrates additional sub-systems of the example Autolink Module 210 illustrated in FIG. 3A, in accordance with the disclosed embodiments. As shown in FIG. 4, the Multi-dimensional Data Module 322 further includes Machine Learning (ML) Models 402, a Natural Language Processing (NLP) Module 404, an NLP Classifier 408, and a Links Generator 408. The Multi-dimensional Data Module 322 provides AKUs data in a multi-dimensional data format to the ML Models 402 for an attribute-based analysis and to the NLP Module 404 for a non-attribute-based analysis of the data. The ML models 402 may include multiple attribute-based sub-modules, such as, but not limited to, phase, location, weather, trade, inspection gateway, sub-contractor, as shown in FIG. 4. It should be noted that the attribute-based sub-modules listed here and depicted in FIG. 4 are for exemplary purposes only, and the disclosure is not limited to these. Further, as described above, the ML models 402 may include a combination of classifiers and ML methodologies. Some of the ML algorithms included in the ML Models 402 may be Multilayer Perceptron, Support Vector Machines, Bayesian learning, K-Nearest Neighbor, or Naive Bayes as part of supervised learning, Generative Adversarial Networks as part of Semi Supervised learning, Unsupervised learning utilizing Autoencoders, Gaussian Mixture and K-means clustering, and Reinforcement learning (e.g., using a 0-learning algorithm, using temporal difference learning), and other suitable learning styles. The ML Models 402 may analyze the multi-dimensional data AKUs data to conduct an attribute-based analysis to correlate the data. For example, as described above, location-based attributes in a plurality of AKU data sets may be correlated or linked together using one or more of the appropriate ML models 402.

Further, NLP module 404 may perform a semantic feature analysis of the multi-dimensional AKUs data sets and apply non-attribute-based machine learning models trained on construction data on the data sets to correlate the data sets. That is, the NLP module 404 may be trained on construction data and/or vocabulary to analyze the data based on construction industry context. For example, the NLP module 404 may be trained to identify the contextual difference between "Are your plans concrete" and "A concrete pour task." Thus, the NLP module 404 may extract and analyze semantic features of the multi-dimensional AKUs data sets to identify correlation and/or linkages between multiple data sets.

Further, the processed data from the ML models 402 and the NLP module 404 is sent to the NLP classifier 406. The NLP classifier 406 may perform text classification of the processed data by assigning a set of tags to one or more portions of the multi-dimensional AKUs data. The NLP classifier 406 may use known techniques of text classification, such as, Rule-based techniques, Machine learning-based techniques, and hybrid techniques. Some examples of the algorithms that may be used by the NLP classifier 406 may include, but are not limited to, Support Vector Machine (SVM), Naive Bayes Classifier, Gradient Boosting, K Nearest Neighbor, and the like. Thus, correlated data provided by the attribute-based and non-attribute-based ML models 402 and the NLP module 404 may be classified further by assigning a set of tags to enable generation of links between the correlated data. For example, all data sets that relate to concrete pouring tasks may be correlated by the ML models 402 and/or the NLP module 404. The NLP classifier 406 may further assign a tag, such as, "setting time" defined in the schedule task as the concrete setting time and recommended by a supplier of the concrete in a supplier datasheet, so that the two could be linked together meaningfully.

Further, the Links Generator 408 receives the processed data from the NLP classifier 406 and generates one or more links between a plurality of data sets based on the relatability of the set of tags. In an embodiment, the Links Generator 408 may generate multiple links between data sets from the plurality of data sources. The multiple links may further be analyzed, based on link scores, for example, to establish a contextual link between data sets from different data sources, as will be described with reference to FIG. 5.

Figure 5:
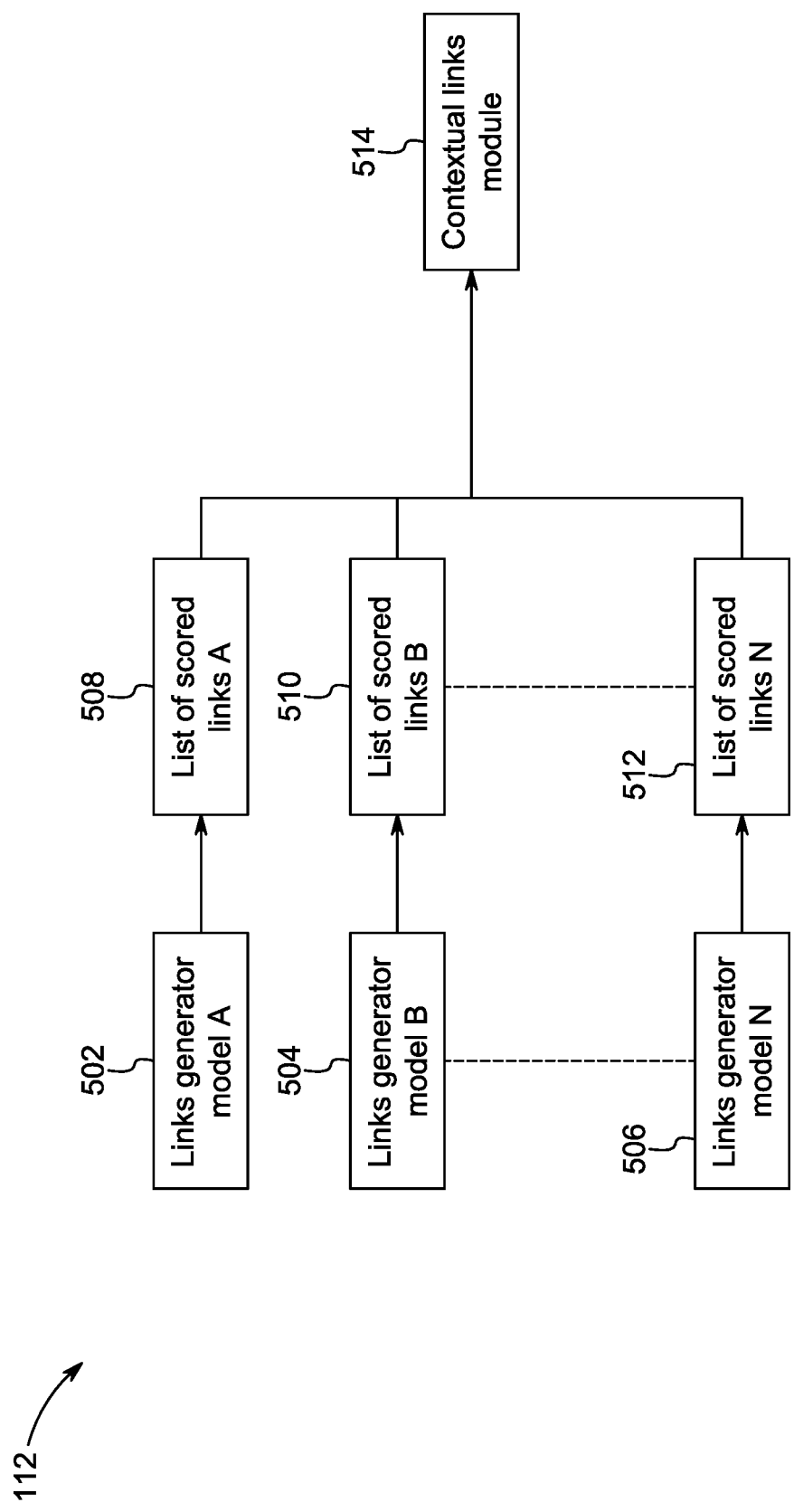
FIG. 5 illustrates an example Model Ensemble of the Autolink Module, according to some embodiments.

FIG. 5 illustrates an example Model Ensemble 112 used by the Autolink Module 210, according to some embodiments. As shown in FIG. 5, multiple links between data may be generated based on different ML models, such as, Model A, Model, B, Model N, and so on, of the Model Ensemble 112. Thus, a Links Generator Model A 502 may generate a list of scored links A 508, a Links Generator Model B 504 may generate a list of scored links B 510, a Links Generator Model N 506 may generate a list of scored links N 512, and so on. In an embodiment, a numeric and/or inferential score may be calculated for each link generated by an ML model of the Model Ensemble 112 between data sets. The numeric and/or inferential score may be calculated by objective evaluation of each link's performance and/or contextual relevance with respect to the set goal and/or objective. For example, if a goal is to link disparate data sets to predict possible budget overshoot, each ML model of the Model Ensemble 112 may establish different links and run an analysis on the relevance of the results. Based on the relevance of the linked data, the ML model may award the associated link a data point. Similarly, all ML models of the Model Ensemble 112 will play different scenarios based on the different links, and each time the goal is met, a data point is awarded to the associated link. Finally, a numeric score may be calculated for each link based on the rewarded data points. In some embodiments, it may be a numeric score, that is, a sum of the data points, for example. In other embodiments, it may be an inferential score based on the analysis of how relevant the established link was in meeting the set objective and/or goal. Thus, a list of scored links may be generated, as shown in FIG. 5.

Finally, the lists of scored links are provided to a Contextual Links Module 514 for correlating and/or selecting the optimal link between the plurality of data sets/sources to establish associative contextual links between data from the plurality of data sources. In an embodiment, the Contextual Links Module 514 may select one or more links with the highest numeric and/or inferential scores to establish the contextual link. In some embodiments, the Contextual Links Module 514 may further analyze and process the generated links to generate new links based on a context, such as, a construction objective. The generated new links may be used by the Contextual Links Module 514 to establish contextual links between data from the plurality of data sources. In some embodiments, the Contextual Links Module 514 is a part of the Links Generator 408 of FIG. 4.

Figure 6:
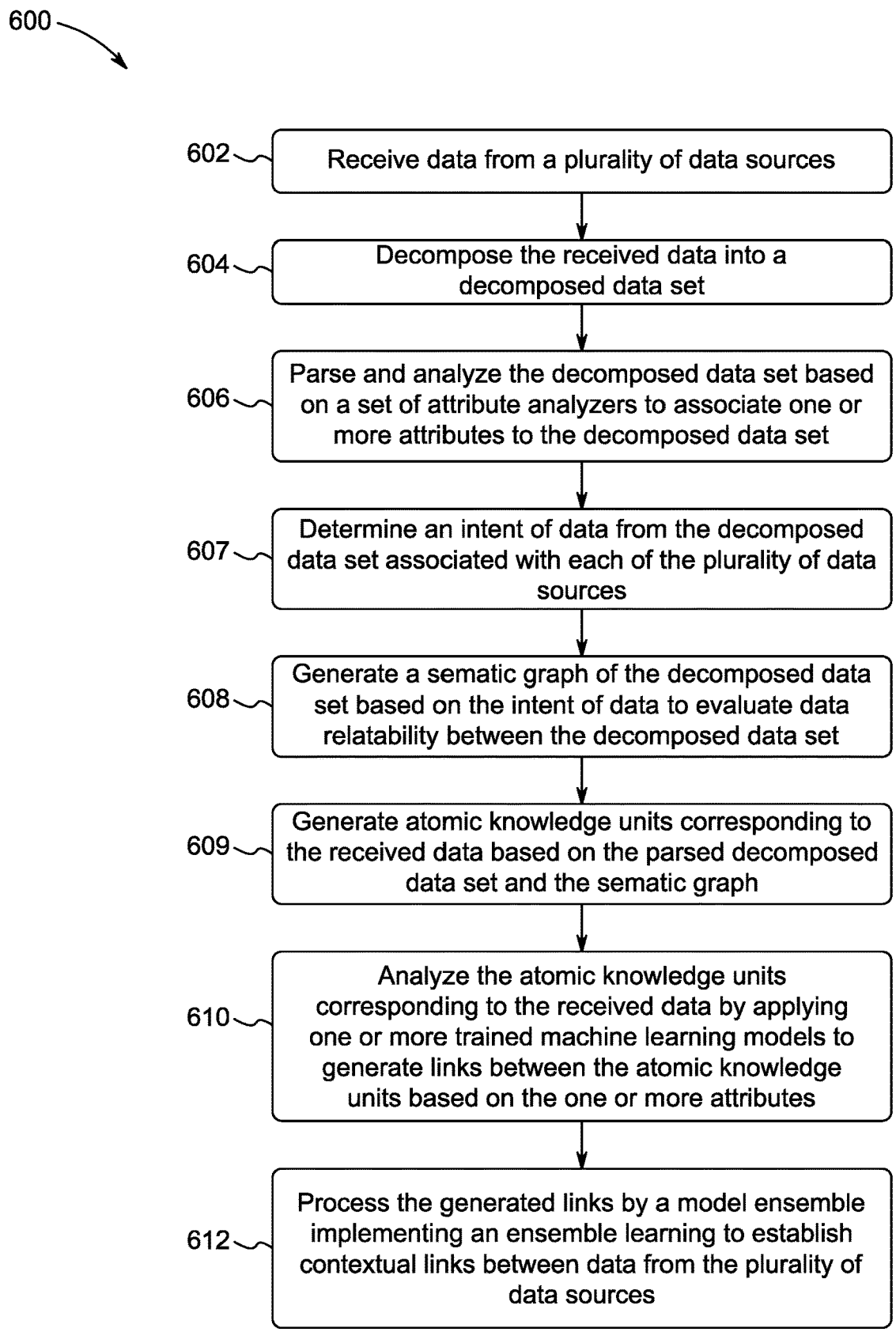
FIG. 6 illustrates a sequential flow diagram for establishing contextual links between data from a plurality of data sources, in accordance with the embodiments presented herein.

FIG. 6 illustrates a method for establishing associative contextual links between data from a plurality of data sources in a computing environment in accordance with embodiments of the present disclosure. FIG. 6 will be explained in conjunction with the description of FIGS. 1 to 5.

At step 602, the Autolink module 210 (generally, the controller 114) forming a part of the server computer 106 may receive data from a plurality of data sources, such that the plurality of data sources may correspond to disparate systems generating unlinked data for a construction project. For instance, as discussed above, the data sources may include one or more systems in a construction environment, such as, but not limited to, construction or AEC site systems, third-party paid or commercial databases, real-time feeds, supplier databases, schedule trackers, daily logs, change order tracking systems, and the like. These data sources may employ different systems and/or formats for tracking, storing, and outputting data, and therefore, the data from these dynamic data sources may be organized in a fashion that it may appear unrelated and/or unlinked to each other.

At step 604, the Autolink module 210 (generally, the controller 114) may decompose the received data into a decomposed data set. For example, as described above, the received data may be broken down into smaller units of phrases or individual words to generate the decomposed data set. Further, some of the smaller units may be relevant, and others may be redundant or irrelevant, such as, articles, prepositions, pronouns, conjunctions, punctuations, etc., which may be removed from further processing.

At step 606, the Autolink module 210 (generally, the controller 114) may parse and analyze the decomposed data set based on a set of attribute analyzers to associate one or more attributes to the decomposed data set. For example, as described above with reference to FIG. 3A, the Atomic Knowledge Units Generator 310 includes Semantic Analyzer 312, Temporal Analyzer 314, Resource Analyzer 316, and Location Parser 318 to parse and analyze the decomposed data set and associate one or more attributes, such as, a temporal notion, a location tag, etc., to an individual schedule task/activity or a portion of the decomposed data set. For example, an individual activity of a construction schedule may specify, "install window frames in cafeteria tomorrow." The individual activity may be parsed and analyzed to identify one or more attributes. For example, the Temporal Analyzer 314 may tag a temporal attribute to the word "tomorrow", and the Location Parser 318 may associate a location of the cafeteria, for example, second floor of the building, to the individual activity.

At step 607, the Autolink module 210 and/or the controller 114 may determine an intent of data from the decomposed data set associated with each of the plurality of data sources. For example, as described above with reference to FIG. 3A, the Data Relatability Analyzer 306 includes an Intent of data module 307 that determines an intent associated with received data. That is, the Intent of data module 307 determines the intent and/or objective associated with an individual task and/or data received from a data source. For example, if a user raises a Request for Information (RFI) about a foundation for a construction project, the Intent of data module 307 determines an intent behind the RFI.

At step 608, the Autolink module 210 and/or the controller 114 may generate a semantic graph of the decomposed data set based on the intent of data to evaluate data relatability between the decomposed data set. For example, as described above with reference to FIGS. 3A and 3B, the Data Relatability Analyzer 306 includes a Semantic Graph module 309 that generates a semantic graph depicting a linkage and/or relationship between data sets extracted from different data sources associated with a construction project.

At step 609, the Autolink module 210 and/or the controller 114 may generate atomic knowledge units corresponding to the received data based on the parsed decomposed data set and the semantic graph, wherein the atomic knowledge units represent received data in an organized data format for further processing. In an embodiment, the parsed and analyzed decomposed data sets are further decoded to generate atomic units of data specifying information in an organized and/or standardized format for establishing linking between data and/or generating insights. These smaller units of organized data are referred to as atomic knowledge units (AKUs) 320, as shown in FIG. 3A.

At step 610, the Autolink module 210 (generally, the controller 114) may analyze the atomic knowledge units corresponding to the received data by applying one or more trained machine learning models to generate links between the atomic knowledge units based on the one or more attributes. As described above, in an embodiment, the atomic knowledge units may be analyzed by attribute-based ML Models 402 and non-attribute-based NLP Module 404 to generate a correlated set of data which may be further processed to generate one or more links between the atomic knowledge units based on the one or more attributes.

At step 612, the Autolink module 210 (generally, the controller 114) may process the generated links by a model ensemble implementing an ensemble learning to establish contextual links between data from the plurality of data sources. As described above with reference to FIG. 5, the Model Ensemble 112 may analyze a list of links with associated scores to compute and/or select an optimal link, as a contextual link between data from the plurality of data sources. Thus, the method 600 provides steps for establishing contextual links between data from a plurality of data sources in a computing environment. The contextual links enable generations of meaningful insights associated with the construction project.

In some embodiments, the contextual links may be further processed. For example, as illustrated in FIG. 2, the contextual inks may be received by the Validation module 212 to be validated by a user and/or provided to train one or more ML models used within the system 100.

In an embodiment, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

The terms "comprising," "including," and "having," as used in the claim and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition, or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures, and techniques other than those specifically described herein can be applied to the practice of the invention as broadly disclosed herein without resort to undue experimentation. All art-known functional equivalents of methods, devices, device elements, materials, procedures, and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation. Additionally, it should be understood that the various embodiments of the networks, devices, and/or modules described herein contain optional features that can be individually or together applied to any other embodiment shown or contemplated here to be mixed and matched with the features of such networks, devices, and/or modules.

While the invention has been described with respect to a limited number of embodiments, those skilled in the art, having benefit of this disclosure, will appreciate that other embodiments can be devised which do not depart from the scope of the invention as disclosed herein.

I claim:

1. A method for generating one or more insights related to a building construction project having one or more construction objectives by establishing and generating associative contextual links between data from a plurality of data sources in a computing environment, the method comprising:

obtaining, via a network, the data from the plurality of data sources based on a request received from a client computer for the one or more insights associated with the building construction project, wherein the plurality of data sources corresponds to disparate systems generating unlinked data;

generating a decomposed data set comprising a relevant data set from the obtained data;

parsing and analyzing the decomposed data set based on a set of attribute analyzers to associate one or more attributes to the decomposed data set;

determining an intent of data from the decomposed data set associated with each of the plurality of data sources by applying a natural language parser;

generating a semantic graph of the decomposed data set based on the intent of data to evaluate data relatability between the decomposed data set;

generating atomic knowledge units corresponding to the data based on the parsed decomposed data set and the semantic graph, wherein the atomic knowledge units represent the data in an organized data format;

training one or more machine learning models using training data, wherein the training data includes data relating to the building construction project and one or more user inputs;

analyzing the atomic knowledge units corresponding to the data by applying the one or more trained machine learning models to generate links between the atomic knowledge units based on the one or more attributes;

processing the generated links by a model ensemble implementing an ensemble learning to establish contextual links between the data from the plurality of data sources;

generating a linked data set based on an analysis of the contextual links; and generating the one or more insights related to the building construction project based on the linked data set and the one or more construction objectives, wherein the construction objectives comprise at least one of schedule optimization of the building construction project, cost optimization of the building construction project and carbon footprint optimization of the building construction project, and the one or more insights identify building construction project actions that contribute to achievement of at least one of the construction objectives.

2. The method of claim 1, further comprising:
analyzing the linked data set based on the one or more construction objectives,
wherein the generated one or more insights correspond to situational and contextual insights related to the building construction project and are based on the analysis of the linked data set in view of the one or more construction objectives.

3. The method of claim 1, wherein applying the one or more trained machine learning models further comprising:
applying attribute-based machine learning models on the atomic knowledge units; and
applying non-attribute-based machine learning models trained on construction data on the atomic knowledge units to generate links between the atomic knowledge units.

4. The method of claim 1, wherein decomposing the received data into the decomposed data set further comprising:
breaking down the received data into smaller units of relevant data and irrelevant data; and
removing the irrelevant data from the decomposed data set.

5. The method of claim 1, wherein parsing and analyzing the decomposed data set based on the set of attribute analyzers comprises analyzing the decomposed data set based on one or more of a semantic analyzer, a temporal analyzer, a resource analyzer, an intent analyzer, and a location parser.

6. The method of claim 1, further comprising storing the atomic knowledge units in a multi-dimensional data format including one or more of a multi-dimensional cube representation, a vector representation, word embeddings, a semantic representation, and a linked graph structure data representation.

7. The method of claim 1, wherein analyzing the atomic knowledge units to generate links between the atomic knowledge units further comprising processing, by a Natural Language Processing (NLP) module, the atomic knowledge units to perform a semantic feature analysis of the atomic knowledge units.

8. The method of claim 7, further comprising:
analyzing, by a NLP classifier, the processed atomic knowledge units to perform text classification by assigning a set of tags to one or more portions of the atomic knowledge units; and
generating links between atomic knowledge units based on a relatability of the set of tags.

9. The method of claim 1, wherein processing the generated links by the model ensemble further comprising:
determining a score associated with each generated link; and
correlating the generated links based on the score and one or more construction objectives to establish the contextual links between data from the plurality of data sources.

10. A system for generating one or more insights related to a building construction project having one or more construction objectives by establishing and generating associative contextual links between data from a plurality of data sources in a computing environment, said system comprising:
an Autolink Module having a controller configured to:
obtain, via a network, the data from the plurality of data sources based on a request received from a client computer for the one or more insights associated with the building construction project, wherein the plurality of data sources corresponds to disparate systems generating unlinked data;
generate a decomposed data set comprising a relevant data set from the obtained data;
parse and analyze the decomposed data set based on a set of attribute analyzers to associate one or more attributes to the decomposed data set;
determine an intent of data from the decomposed data set associated with each of the plurality of data sources by applying a natural language parser;
generate a semantic graph of the decomposed data set based on the intent of data to evaluate data relatability between the decomposed data set;
generate atomic knowledge units corresponding to the data based on the parsed decomposed data set and the semantic graph, wherein the atomic knowledge units represent the data in an organized data format;
train one or more machine learning models using training data, wherein the training data includes data relating to the building construction project and one or more user inputs;
analyze the atomic knowledge units corresponding to the received data by applying one or more trained machine learning models to generate links between the atomic knowledge units based on the one or more attributes;

process the generated links by a model ensemble implementing an ensemble learning to establish contextual links between the data from the plurality of data sources;

generate a linked data set based on an analysis of the contextual links; and generate the one or more insights related to the building construction project based on the linked data set and the one or more construction objectives, wherein the construction objectives comprise at least one of schedule optimization of the building construction project, cost optimization of the building construction project and carbon footprint optimization of the building construction project, and the one or more insights identify building construction project actions that contribute to achievement of at least one of the construction objectives.

11. The system of claim 10, further comprising an Insights Module configured to:

analyze the linked data set based on the one or more construction objectives, wherein the generated one or more insights correspond to situational and contextual insights related to the building construction project and are based on the analysis of the linked data set in view of the one or more construction objectives.

12. The system of claim 10, wherein the controller is further configured to:

apply attribute-based machine learning models on the atomic knowledge units; and apply non-attribute-based machine learning models trained on construction data on the atomic knowledge units to generate links between the atomic knowledge units.

13. The system of claim 10, the controller is further configured to:

break down the received data into smaller units of relevant data and irrelevant data; and remove the irrelevant data from the received data to generate the decomposed data set.

14. The system of claim 10, further comprising an Atomic Knowledge Units Generator configured to parse and analyze the decomposed data set, the Atomic Knowledge Units Generator comprises a semantic analyzer, a temporal analyzer, a resource analyzer, an intent analyzer, and a location parser.

15. The system of claim 10, further comprising a Multi-dimensional Data Module configured to store the atomic knowledge units in a multi-dimensional data format including one or more of a multi-dimensional cube representation, a vector representation, word embeddings, a semantic representation, and a linked graph structure data representation.

16. The system of claim 10, further comprising a Natural Language Processing (NLP) Module configured to perform a semantic feature analysis of the atomic knowledge units.

17. The system of claim 16, further comprising an NLP Classifier configured to perform text classification on processed atomic knowledge units by assigning a set of tags to one or more portions of the atomic knowledge units, wherein the links between atomic knowledge units are generated based on the set of tags.

18. A non-transitory computer-readable storage medium, having stored thereon a computer-executable program for generating one or more insights related to a building construction project having one or more construction objectives, which, when executed by at least one processor, causes the at least one processor to:

obtain, via a network, data from a plurality of data sources based on a request received from a client computer for the one or more insights associated with the building construction project, wherein the plurality of data sources corresponds to disparate systems generating unlinked data;

generate a decomposed data set comprising a relevant data set from the obtained data;

parse and analyze the decomposed data set based on a set of attribute analyzers to associate one or more attributes to the decomposed data set;

determine an intent of data from the decomposed data set associated with each of the plurality of data sources by applying a natural language parser;

generate a semantic graph of the decomposed data set based on the intent of data to evaluate data relatability between the decomposed data set;

generate atomic knowledge units corresponding to the data based on the parsed decomposed data set and the semantic graph, wherein the atomic knowledge units represent the data in an organized data format;

train one or more machine learning models using training data, wherein the training data includes data relating to the building construction project and one or more user inputs;

analyze the atomic knowledge units corresponding to the received data by applying one or more trained machine learning models to generate links between the atomic knowledge units based on the one or more attributes;

process the generated links by a model ensemble implementing an ensemble learning to establish contextual links between the data from the plurality of data sources;

generate a linked data set based on an analysis of the contextual links; and generate the one or more insights related to the building construction project based on the linked data set and the one or more construction objectives, wherein the construction objectives comprise at least one of schedule optimization of the building construction project, cost optimization of the building construction project and carbon footprint optimization of the building construction project, and the one or more insights identify building construction project actions that contribute to achievement of at least one of the construction objectives.

* * * * *